May 3, 1966
C. FARO ETAL
3,249,304
METHOD OF SPRAYING PLASTIC MATERIALS
Filed July 19, 1961
3 Sheets-Sheet 1
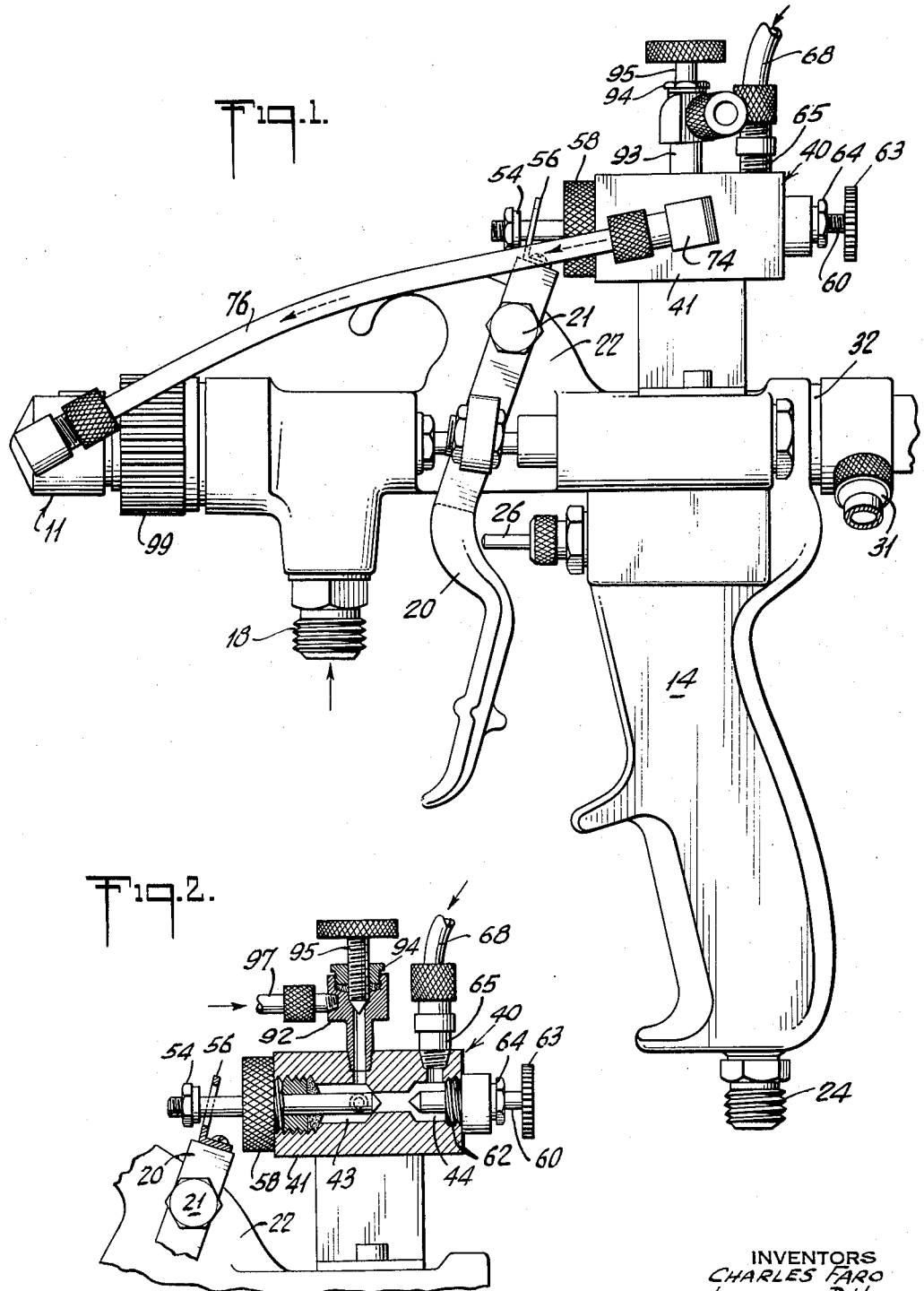
INVENTORS
CHARLES FARO
LAWRENCE D. HUGHES
BY
ATTORNEY May 3, 1966  C. FARO ETAL  3,249,304
METHOD OF SPRAYING PLASTIC MATERIALS
Filed July 19, 1961  3 Sheets-Sheet 2
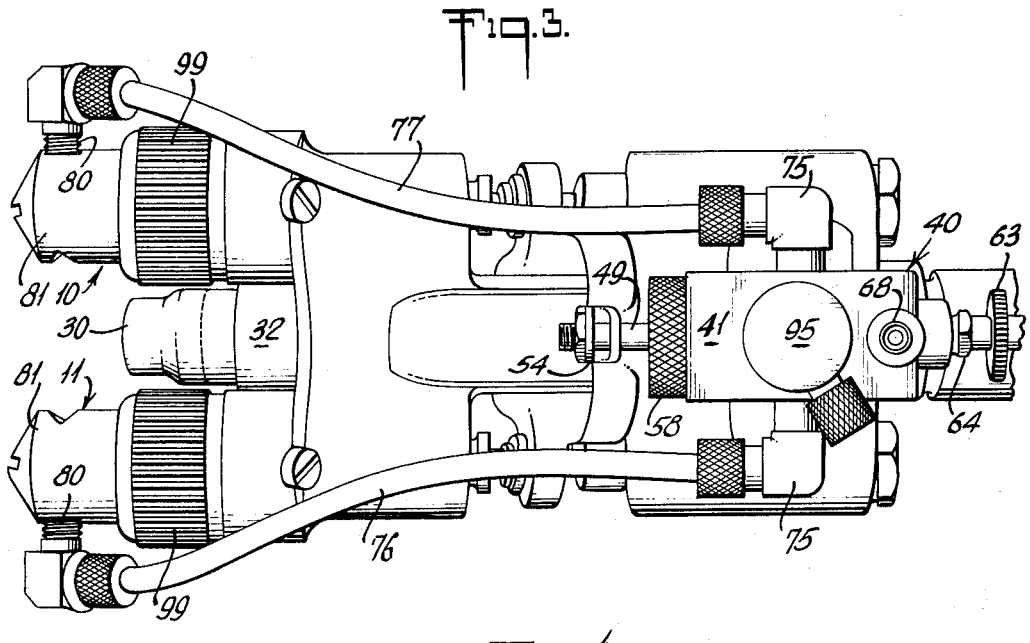
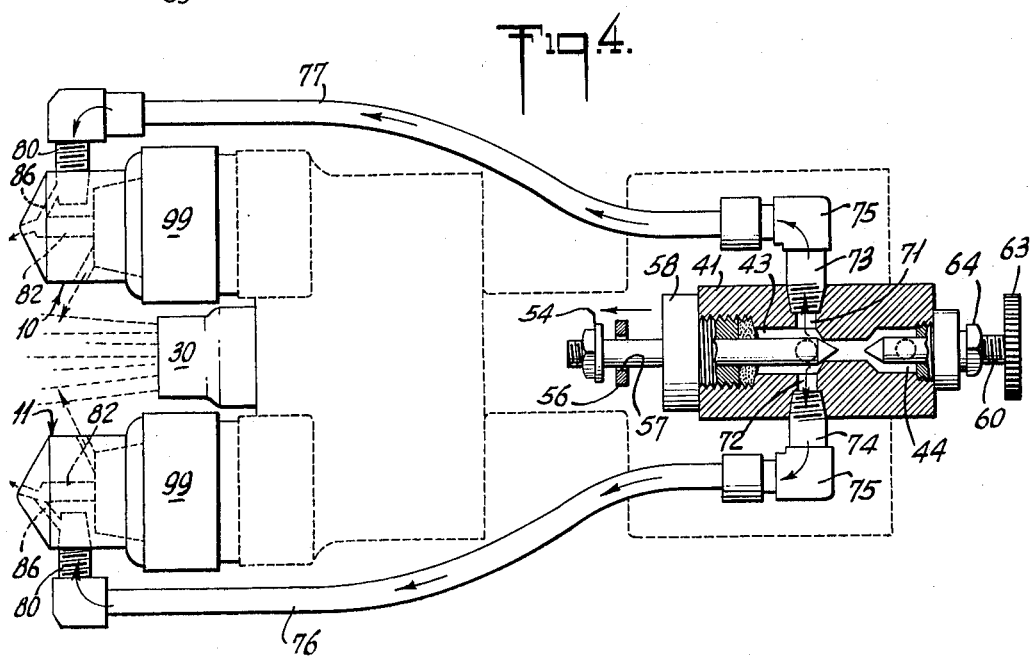
INVENTORS
CHARLES FARO
LAWRENCE D. HUGHES
BY
ATTORNEY May 3, 1966  C. FARO ETAL  3,249,304
METHOD OF SPRAYING PLASTIC MATERIALS
Filed July 19, 1961  3 Sheets-Sheet 3
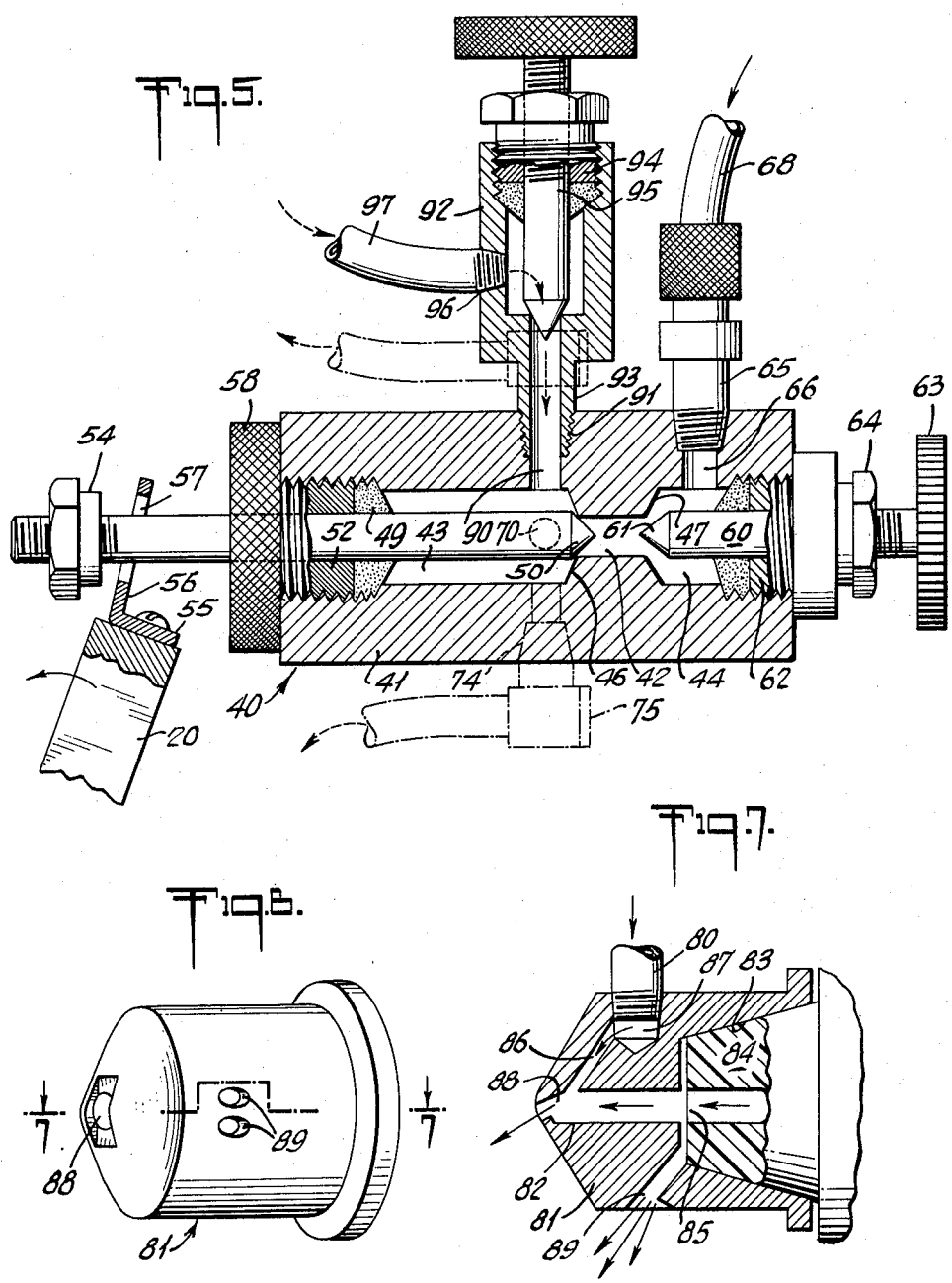
INVENTORS
CHARLES FARO
LAWRENCE D. HUGHES
BY
ATTORNEY

United States Patent Office 3,249,304
Patented May 3, 1966

3,249,304
METHOD OF SPRAYING PLASTIC MATERIALS
Charles Faro, 6854 De Anza St., and Lawrence D. Hughes, 4494 Lemon St., both of Riverside, Calif.
Filed July 19, 1961, Ser. No. 125,169
3 Claims. (Cl. 239—10)

This invention relates to method of spraying plastic coatings and reinforced plastic products.

In recent years there has come into rather extensive use, the system of applying resinous plastics, with and without fiber reinforcement, for the production of coatings and so-called laminates, by the spraying of the resinous plastic material. This system is particularly adaptable to and has been widely used for the application of polyester resins, epoxy resins, and urethane resins, which may be converted at ambient atmospheric temperatures from a liquid phase to a solid substance, by admixture with an appropriate promoter or accelerator and an organic peroxide catalyst.

Polymerizable polyester compositions are described in many United States Letters Patents, of which Numbers 2,632,571, 2,646,416, and 2,652,383, are typical. Polymerizable polyester compositions are defined as mixtures of unsaturated alkyd resins having a plurality of alpha, beta ethylenically unsaturated groups, with ethylenically unsaturated monomers. Upon polymerization, the ethylenically unsaturated monomer serves as a cross-linking agent to form an infusible resin. This polymerization or curing of the liquid resin is customarily achieved by means of an organic peroxide catalyst, such as methylethylketone peroxide, cumene hydroperoxide, benzoyl peroxide, and the like, in the present of a promoter or accelerator comprising an organic metallic salt, such as cobalt naphthenate. Upon addition of both the catalyst and the promoter, polyester resins may solidify in a matter of ten to forty-five minutes. Although polyester resins may be inhibited against gelling, i.e., the first phase-change from liquid to solid, as by means of certain quinones or hydro-quinones, in hours rather than minutes, the final solid plastic thereby obtained suffers a considerable loss in potential physical strength. Accordingly, the limited time available for application of polyester resins admixed with promoter and catalyst before gelling of the mixture, unavoidably resulted in waste of material.

In order to eliminate this waste factor, two somewhat different methods of continuously blending the resin with the catalyst and promoter have heretofore been used, but with limited success.

According to one of these methods, exemplified by patents to Barrett, No. 2,813,751, and to Anderson No. 2,787,314 and No. 2,933,125, the polyester resin is divided into two equal size batches, one of which contains the promoter, and the other of which contains the catalyst. In use, these separate batches are blended in equal amounts. While that procedure is an improvement over the small batch mixing of the three ingredients, the batch containing the catalyst nevertheless gels in five hours to five days (depending upon the catalytic reactivity) even in the absence of promoter. Thus, while this so-called "two-pot" system reduces waste, it does not entirely eliminate it.

According to the other of the two methods of blending referred to above, the catalyst is injected into a mixture of the resin and promoter, during the spraying of the promoter-containing resin. For that purpose, one form of applicating tool operates by injecting the catalyst under pressure with the atomizing air into a stream of the liquid resin containing the promoter, during the passage of the promoter-containing resin through the applicating equipment. Although this mode of injecting the catalyst results in a substantially uniform admixture thereof with the liquid resin and promoter, it introduction under pressure with the atomizing air through the applicating equipment gives rise to two serious hazards. Firstly, the organic peroxide catalyst customarily employed, possess high potential energy and have been known to explode spontaneously under pressure in the gaseous state. Secondly, due to the toxicity of the atomized peroxide catalyst, continuous subjection of an operator to the vapors of the catalyst for a relatively long period of time constitutes a health hazard which may in some cases lead to partial paralysis.

Another form of applicating tool heretofore used in the so-called catalyst injection method operates by introducing the catalyst under atmospheric pressure through hollow needles extending within the applicating tool. Although this mode of injection of the catalyst eliminates the danger of explosion, as well as the toxic hazard present in method described above in which the vaporized catalyst is injected under pressure with the atomizing air, it has a serious short-coming in that it does not provide for adequately and uniformly mixing the catalyst with the mixture of liquid resin and promoter. Furthermore, in this instance, as in the one first mentioned, the surfaces of the applicating tool with which the catalyst comes into contact are subjected to attack by the extremely corrosive properties of the organic peroxide catalysts usually employed. Moreover, in both instances, it is necessary, immediately upon completion of a job or a period of operation which is to be followed by a period of idleness of the tool, the entire tool must be flushed with a suitable solvent to remove all trace of catalyst in order to prevent solidification of the resin remaining as residue within the tool, or section thereof.

The principal object of the invention, accordingly, is to provide an improved method for the spray application of resinous plastic in the production of plastic coatings and fiber reinforced plastic products, which will avoid the necessity of mixing the components in small batches, and which will greatly reduce or entirely eliminate the waste of materials involved in the use of the so-called "two-pot" system referred to above.

Another object of the invention is to provide an improve method for the purposes aforesaid, which will eliminate the safety and health hazards attending the use of the catalyst injection method referred to above, wherein the catalyst is injected under pressure and introduced into the mixture of the plastic resin and accelerator with the atomizing air, and which will, at the same time, remedy the inadequate and non-uniform mixing of the components experienced in the use of the catalyst injection method referred to above, wherein the catalyst is injected under atmospheric pressure through hollow needles within the applicating tool.

Still another object of the invention is to provide a method as aforesaid, which will eliminate the necessity for flushing the entire applicating tool with a solvent upon completion of the particular job or period of operation which is to be followed by a period of idleness of the tool.

Still a further object of the invention is to provide a method as aforesaid, which will preclude contact of substantially all of the working surfaces of the applicating tool by the extremely corrosive catalyst customarily employed.

Yet another object of the invention is to provide a method as aforesaid, which will be useful in applying fiber reinforced plastics on vertical or overhead surfaces as efficiently as horizontal areas. This object will be particularly useful in building construction and fabrication of building material and other related uses.

Briefly stated, the foregoing objects of the invention may be achieved by feeding a mixture of the resin and the accelerator through the nozzle of the spray gun and injecting the liquid catalyst into the mixture by introducing a fine stream of the catalyst into the mixture immediately ahead of its discharge from the nozzle, the catalyst being introduced at that point at an angle with respect to the axis of the nozzle such as will create a turbulence sufficient to cause the catalyst to become substantially completely and uniformly mixed with the mixture of the resin and the accelerator internally of the nozzle. To that end, the angle at which the stream of the catalyst may be introduced is in the range of 20 to 90 degrees, preferably 30 to 60 degrees, with respect to the axis of the nozzle. In accordance with the invention also, this introduction of the catalyst in the form of a fine stream into the mixture of the resin and the accelerator, is effected in unison with the discharge of the atomized mixture from the nozzle of the spray gun. That is to say, in the apparatus for carrying the method of the invention, the nozzle orifice is trigger-controlled for closing and opening the same to permit the liquid mixture of the resin, accelerator and catalyst to flow therethrough for time intervals as desired, the trigger for the orifice being arranged also to control the movement of valve means for feeding the liquid catalyst from a source of supply thereof, to the nozzle of the spray gun.

The invention and the several advantages thereof will be more clearly understood from the detailed description herebelow and from the accompanying drawings in which:

FIG. 1 is a view in side elevation of one form of spray apparatus embodying the invention;

FIG. 2 is a fragmentary view thereof, showing parts in cross-section;

FIG. 3 is a top plan view of the apparatus of FIG. 1;

FIG. 4 is a diagrammatic plan view thereof, partly in section;

FIG. 5 is a view on an enlarged scale, partly in section and partly in elevation, of a portion of the apparatus of FIG. 1;

FIG. 6 is a detail view, in perspective, of the air cap utilized for the nozzle of the apparatus in accordance with the invention; and FIG. 7 is a view thereof, in cross-section, taken along line 7—7 of FIG. 6.

Referring more in detail to the drawings, the invention is therein illustrated as performed by means of a spray gun apparatus, forming the subject matter of our copending application Serial No. 452,424, filed Februray 24, 1965, as a division of the present application. As shown in the drawing, the gun apparatus is constructed with a pair of spaced parallel nozzles, each arranged for discharging an atomized stream of liquid resin, such as polyester resin, admixed with accelerator and catalyst.

The nozzles, indicated at 10, 11, are mounted in horizontally spaced relation at the front of the gun body, and a grip or handle, indicated at 14, is formed at the rear of the gun body. The desired mixture of liquid resin and accelerator may be delivered to the gun at the rear of the nozzles, through a fitting 18, secured to one end of a flexible hose (not shown) the other end of which is connected to a container (not shown) of the liquid, maintained under super-atmospheric pressure by means of a suitable compresser (not shown).

Control of flow of the liquid through each of the nozzles may be effected by means of suitable valves (not shown) such as needle valves slidably supported to the rear of and in axial alignment with the orifice of each nozzle, and actuatable by a trigger 20 pivoted at 21 to a plate or bracket 22 extending upwardly along the center of the gun body, whereby rearward movement of the trigger 20 on its pivot will move the needle elements rearwardly to withdraw the points of the needle elements from within the orifices of the nozzles, to thereby permit the liquid to flow through the orifices, and the needles returning to their normal position closing the orifices, under the influence of compression springs when pressure of the hand is released from the trigger 20.

Air for atomizing the liquid discharged from the nozzles is delivered under pressure through a flexible hose (not shown) connected to a fitting 24 and having its opposite end connected to the compresser (not shown), the air passing through a bore extending through the handle 14 and connected to a horizontally extending bore in the body of the gun through a suitable air valve between the bores and actuated to its open position by rearward movement of a plunger 26 forming a part of the air valve, when the rear surface of the trigger 20 comes into contact with the outer end of the plunger upon pivotal movement of the trigger rearwardly of its normal position.

The parts of the spray apparatus thus far described are substantially like the corresponding parts of the apparatus described in the above-mentioned patent to Barrett No. 2,813,751. It will be apparent, however, from the more detailed description of the invention herebelow, that the same may be adapted to other known forms of spray apparatus, whether of the single nozzle or double nozzle type, suitable for use in applying liquid resins such as those of the polyester type.

The apparatus herein illustrated also includes means for projecting a stream of relatively short lengths of reinforcing fiber, such as glass fiber, simultaneously with the spraying of the mixture of liquid resin, accelerator and catalyst. To that end, the gun body may have a suitable chopper or cutter housed thereon, and arranged to receive a continuous length of fiber roving fed from a convenient source of supply, and to cut the fiber into relatively short lengths, which are ejected through a nozzle 30 disposed intermediate the nozzles 10, 11 and having its axis parallel to the axes of the nozzles 10, 11. Air under pressure, for ejecting the cut lengths of fiber may be delivered from a suitable source (not shown) through a flexible hose connected to the fitting 31 connected to the air tube or barrel 32 extending longitudinally along the center of the gun body. In lieu of the aforesaid arrangement for feeding continuous lengths of fiber roving to the gun body, other known mechanism may be employed for cutting the same into short lengths and ejecting the same through the center orifice Venturi tube. Upon discharge, the fibers are fanned out into the desired pattern by air jets and instantly enveloped by the pre-catalyzed liquid plastic from the fluid nozzles. It will be understood that the apparatus may embody other known mechanisms, such as those illustrated in the above-mentioned patents to Anderson, Nos. 2,787,314 and 2,933,125, for achieving that purpose.

In accordance with the invention, as above stated, the catalyst is injected into the mixture of pre-accelerated resin sprayed from the nozzles 10, 11, by introducing a fine stream of the catalyst into the resin-accelerator mixture immediately ahead of its discharge from the nozzles, the stream of the catalyst being introduced at an angle with respect to the axis of the nozzles such as to create a turbulence sufficient to bring about substantially complete and uniform internal mixing of the catalyst with the resin-accelerator mixture. Furthermore, in accordance with the invention, this injection of the catalyst into the resin-accelerator mixture is arranged to operate in unison with the discharge of the mixture from the orifices of the nozzles.

To those ends, the apparatus of the invention includes a valve mechanism, indicated generally by numeral 40, mounted on the gun body, preferably toward the rear thereof and at a convenient distance above the gun body and substantially in vertical alignment with the handle or grip 14.

Referring more particularly to FIG. 5, the valve mechanism comprises a relatively elongated body member 41 disposed longitudinally of the gun body and provided with an axially extending bore comprising an intermediate restricted portion 42, an enlarged portion 43 joining the restricted portion 42 at the forward end thereof, and a similarly enlarged portion 44 joining the restricted portion 42 at the rear of the latter, the surfaces at the inner ends of the portions 43, 44 being of frusto-conical configuration, as indicated at 46, 47. A valve stem or needle 49 extends into the portion 43 of the bore and has its inner end 50 formed with a conical surface for seating on the surface 46, this stem 49 being carried by a fitting 52 externally threaded for securement to the threaded forward end of the valve body. The stem 49 is of a length to extend externally of the body member 41 for a substantially distance forwardly thereof. The outer or forward end of the stem 49 is threaded for the reception of a threaded collar 54. Fixed to the upper end of the trigger 20, above its pivot 21, is a bracket 55 having an upwardly extending arm 56 formed with an enlarged opening 57 loosely surrounding the externally extending portion of the stem 49, and disposed between the collar 54 and the knob portion 58 of the fitting 52.

Extending into the portion 44 of the bore of the body member 41 is a stem or needle 60 having its inner end 61 formed as a conical surface for seating on the surface 47 to thereby close the outer end of the restricted portion 42 of the bore. The stem 60 extends through a fitting 62 externally threaded for engagement with the threaded portion at the rear end of the body 41, the stem being threaded adjacent its outer end for adjusting its position, as by means of a knob 63 secured at its outer end, the stem being fastened in adjusted position as by means of a lock nut 64.

A threaded fitting 65 engages the body member 41 in axial alignment with a radially extending passage 66 connected at its inner end with the portion 44 of the bore. The outer end of the fitting 65 may be connected in any convenient manner with one end of a flexible hose 68, having its opposite end connected to a container (not shown), containing a supply of catalyst to be injected into the mixture of resin and accelerator. The container for the catalyst is preferably maintained under pressure above atmospheric to allow uniform quantity control under varying relative elevations of apparatus and is preferably of small enough size to be carried by the operator of the spray apparatus or by the man attending the hose lines, although if desired, it may be placed near the area being sprayed and moved about from time to time as the work progresses.

As above indicated, the catalyst is usually a liquid commercial methylethylketone peroxide, particularly when using polyester resins for the production of coatings or reinforced plastic products in which the finished cured plastic is required to possess good weather stability and chemical resistance.

The catalyst fed into the body member 41 is fed at a controlled rate, by suitable adjustment of the stem 60, through the portion 42 of the bore and into the enlarged portion 43 thereof, from which it flows through an opening 70 to radially extending passages 71, 72. Threaded fittings 73, 74 are connected to the passages 71, 72, respectively. The fittings 73, 74 may be connected, as by elbows 75, to flexible tubing or hose lines 76, 77, for feeding a catalyst flowing through the opening 70, to each of the nozzles 10, 11.

For that purpose, the opposite end of each of the tubings 76, 77 is connected to a hollow fitting 80, externally threaded for connecting the same to an internally threaded opening 87, extending radially, immediately to the rear of the conical tip of the air cap.

As illustrated more in detail in FIG. 7, the fitting 80 is threaded radially into the air cap 81 of the nozzles. The air cap 81 is provided with an axial bore 82 extending inwardly from the tip end of the cap and terminating in a frusto-conical shaped recess 83 which receives the correspondingly shaped outer surface of the fluid tip 84, formed with an axially extending orifice 85 through which the mixture of liquid resin and accelerator is discharged under control of a needle element (not shown).

In accordance with the invention, an opening 86 is formed in the air cap so as to connect the inner end of the opening which receives the fitting 80, with the bore 82. The connecting opening 86 preferably extends at an angle of 30 to 60 degrees with respect to the axis of the bore. The opening 86 is preferably circular, and may be of such a diameter that the catalyst delivered through the fitting 80 may be controlled as it is introduced into the mixture of the resin and the accelerator flowing through the bore 82. By thus injecting the catalyst in the form of a fine stream and at a relatively high velocity into the mixture of resin and accelerator flowing through the bore 82, a turbulence is created within the bore, sufficient to effect a substantially complete and uniform mixing of the catalyst with the mixture of resin and accelerator immediately ahead of its discharge from the air cap.

As will be noted particularly from FIG. 7, the bore 82 of the air cap, in the embodiment illustrated, is formed with a portion 88 having its axis inclined with respect to the axis of the main portion of the bore 82. In the apparatus herein illustrated, utilizing two horizontally spaced nozzles 10, 11, the portions 88 of the bores 82 have their axes inclined towards one another, as illustrated in FIG. 4, at an angle such that they will intersect one another at a point ahead of the nozzle along a line substantially midway between the two nozzles. Thus, the plastic mixture will issue from each of the nozzles in a direction effectively and uniformly to coat and completely envelope the chopped or cut pre-shaped fibers having been ejected under air pressure from the nozzle 30.

As will be seen from FIGS. 6 and 7, the air cap 81 is also provided with air openings 89 extending from the inner end of the frusto-conical recess 83 with their axes inclined forwardly and outwardly to the surface of the air cap. These openings emerge from the outer peripheral surface of the air cap at vertically spaced points on opposite sides of the longitudinal axis of the bore 82, and somewhat to the rear of the conical tip of the air cap. Air discharged from these openings fans the chopped fibers out to the desired oblong shape just prior to envelopment by the liquid plastic.

It will be understood, of course, that the air caps 81 are mounted on the fluid tips 84 which are fastened to the body of the gun, and that the air caps are secured in axial alignment with the fluid tips, as by means of suitable retainer rings 99.

By reason of the fact that the catalyst, according to the present invention, is not brought into admixture with the polymerizable resin at any stage of the operation or at any point in the apparatus until just prior to discharge of the atomized mixture from the nozzle or nozzles, it will be evident that no part of the apparatus, except the air caps 81, will need to be flushed, upon completion of a particular job or period of operation, in order to prevent solidification of the resin during the ensuing period of idleness of the apparatus.

The air caps 81 may readily be flushed by providing the apparatus with mechanism for feeding a flushing solvent, such as those of the ketone, ester, and chlorinated hydrocarbon types, directly to the air caps. For that purpose, as illustrated in FIGS. 1, 2 and 5, the body member 41 is formed with a passageway 90, extending radially upward from the enlarged portion 43 of the bore, preferably adjacent the rear end of the latter and with its axis parallel to that of the passageway 66. At its outer end, the passageway 90 terminates in a threaded recess 91 extending inwardly from the upper surface of the valve body 41. A cylindrical thimble 92, having a threaded stem 93 at its lower end is fastened thereby in the threaded recess 91. At its upper end, the thimble 92 is closed by a threaded cap 94, through which there passes a needle valve 95 in threaded engagement, at its upper end, with the cap 94. The side wall of the thimble 92 is provided with a threaded opening 96 for connecting thereto one end of a flexible tubing or hose 97, the opposite end of which may be connected to a source of supply of the flushing solvent (not shown).

Thus, when it becomes necessary or desirable to flush the air caps 81, the needle valve 95 need merely be withdrawn from its seat, thus permitting the flushing solvent which enters the thimble 92 to flow directly through the passageway 70 and the tubes 76, 77, to dissolve and wash away such quantities of the catalyst as may remain therein.

What is claimed is:

1. In the spraying of a substantially uniform mixture of a polymerizable resin and a polymerization catalyst, wherein said mixture is formed internally of a spray gun by feeding a stream of said resin through a first path to a mixing location disposed immediately preceding the ejection of the mixture from the spray gun while simultaneously feeding a stream of said catalyst through a second path to said mixing location, and wherein said second-named path intersects said first-named path at said location to effect substantially uniform mixing of said resin and said catalyst at said location, the improvement which comprises preventing polymerization of any of said resin remaining in the spray gun when said feeding of said resin and said feeding of said catalyst to said mixing location are discontinued for a period of idleness of the spray gun, said prevention of polymerization being effected solely by purging from the spray gun, substantially immediately upon discontinuance of said feedings, any catalyst remaining in the spray gun, said purging consisting essentially of the steps of (i) feeding a stream of a solvent for said catalyst into and through said second-named path only, from a point remote from said mixing location, and to and through said mixing location, and (ii) ejecting the thus dissolved catalyst.

2. The improvement defined in claim 1, wherein said stream of catalyst being fed through said second-named path intersects said stream of resin being fed through said first-named path at an angle in the range of 30° to 50° with respect to the axis of ejection of said mixture from the spray gun.

3. In the spraying of a substantially uniform mixture of a polymerizable resin and a polymerization catalyst, wherein said mixture is formed internally of a spray gun by feeding two separate streams of said resin through a pair of separate paths, one of said paths leading to one of a pair of mixing locations, each disposed immediately preceding the ejection of the mixture from the spray gun, while simultaneously feeding a stream of said catalyst through each one of a second pair of paths to one of each of said mixing locations, said second-named pair of paths being separate from the first-named pair of paths, and wherein one each of said paths of said second-named pair respectively intersects one of each of said first-named pair of paths at the respective mixing location, the improvement which comprises preventing polymerization of any of said resin remaining in the spray gun when said feedings of said resin and said feedings of said catalyst to said mixing locations are discontinued for a period of idleness of the spray gun, said prevention of polymerization being effected solely by purging from the spray gun, substantially immediately upon discontinuance of said feedings, any catalyst remaining in the spray gun, said urging consisting essentially of the steps of (i) feeding a solvent for said catalyst in a separate stream from a single source into and through each of said paths of the second-named pair of paths only, from a point remote from said mixing locations, and to and through the respective mixing locations, and (ii) ejecting the thus dissolved catalyst.

References Cited by the Examiner

UNITED STATES PATENTS

| | | | |
|---|---|---|---|
| 1,981,405 | 11/1934 | Wrede | 117—105.5 |
| 2,584,178 | 2/1952 | Abbott et al. | 239—414 |
| 2,788,337 | 4/1957 | Preiswerk et al. | 117—105.5 X |
| 2,847,196 | 8/1958 | Franklin et al. | 117—104 |
| 2,878,063 | 3/1959 | Kish et al. | 118—300 X |
| 2,890,836 | 6/1959 | Gusmer et al. | 117—104 |
| 2,894,732 | 7/1959 | Taber et al. | 117—104 |
| 2,955,058 | 10/1960 | Foster | 117—105.5 |
| 2,958,471 | 11/1960 | Zippel | 239—414 |
| 2,991,015 | 7/1961 | Standlick | 239 |
| 3,039,702 | 6/1962 | Shelton | 239—428 X |
| 3,049,439 | 8/1962 | Coffman | 118—300 |
| 3,176,922 | 4/1965 | Decker | 239—112 |

OTHER REFERENCES

Sprayup, Modern Plastics, vol. 36, No. 9, May 1959, pp. 85–89, 210, 211 and 214.

RICHARD D. NEVIUS, *Primary Examiner.*

JOSEPH B. SPENCER, *Examiner.*